United States Patent Office 3,226,433
Patented Dec. 28, 1965

3,226,433
MAKING METHANESULFONYL CHLORIDE
Clifton F. Bennett and David W. Goheen, Camas, Wash., assignors to Crown-Zellerbach Corporation, San Francisco, Calif., a corporation of Nevada
No Drawing. Filed Jan. 2, 1962, Ser. No. 163,916
6 Claims. (Cl. 260—543)

This invention relates to a process for making methanesulfonyl chloride.

Methanesulfonyl chloride is of commercial interest as a solvent and as an intermediate for the production of various organo-chemical products including polymers, plasticizers, detergents, dyestuffs, fumigants, insecticides, flameproofing compounds and therapeutic drugs. Its commercial application heretofore has been restricted, however, by its relatively high cost and problems attending its preparation.

Accordingly it is the general object of the present invention to provide a process of making methanesulfonyl chloride in high yields, by a relatively simple procedure, using as the starting material a chloromethyl methyl sulfide, such as monochlorodimethyl sulfide. The latter, in turn, is readily derivable from the dimethyl sulfide now available in large amount and at low cost as a byproduct contained in, and isolated commercially from, the pulping spent liquors of the papermaking industry.

The reaction occurring during the hereindescribed process is exemplified by the following reaction occurring during the conversion of monochlorodimethyl sulfide to methanesulfonyl chloride:

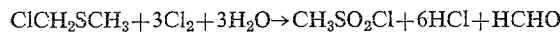

In place of the monochlorodimethyl sulfide, however, there may be employed any of the chloromethyl methyl sulfides, or mixtures thereof. Included in this group are monochloromethyl sulfide (monochlorodimethyl sulfide), dichloromethyl methyl sulfide and trichloromethyl methyl sulfide. These are made by chlorinating dimethyl sulfide and may be used singly or in combination with each other.

With monochlorodimethyl sulfide or other chloromethyl methyl sulfides the reaction can be carried out with much greater facility and without the necessity of cooling the reaction mixture to the extent that would be required if the unchlorinated compound were to be used as the starting material. Although the exact mechanism is not known, the effect of this substitution is readily demonstrable and includes the production of substantially increased yields of the desired methanesulfonyl chloride product in substantially decreased reaction times.

The three basic components of the reaction mixture, i.e. the chloromethyl methyl sulfide, the water, and the chlorine are used preferably in amounts suited to the stoichiometry of the reaction as indicated in the above equation. Thus there should be used at least 3 moles of water, preferably from 3–10 moles of water, for each mole of chloromethyl methyl sulfide starting material. At least 3 moles of water are required for conversion of the starting material to a maximum amount of desired product. A large excess of water, however, includes hydrolytic degradation of the product.

Similarly, the amount of chlorine employed should be regulated as required to produce a maximum yield of product. Accordingly about 3 moles of chlorine should be employed for each mole of chloromethyl methyl sulfide, lesser amounts resulting in decreased yields and greater amounts leading to chlorinated byproducts.

Surprisingly, in view of the ease with which most organic compounds are chlorinated by the action of elemental chlorine, the production of significant amounts of undesirable chlorinated derivatives of methanesulfonyl chloride can be avoided in the practice of the present invention. These products are kept at a negligible level when a chloromethyl methyl sulfide, as opposed, for example, to unchlorinated dimethyl sulfide, is used as a starting material.

It is desirable for maximum yield to keep the reaction mixture at a temperature of from −20° C. to +25° C., preferably from −10° to +10° C. This may be accomplished by extraneous cooling of the reaction vessel in a suitable manner.

Further to increase the yield of product obtained, as well as the speed of the reaction and the ease with which the product may be recovered, it may be desirable to include as a component of the reaction mixture a suitable acid or a mutual solvent for the chloromethyl methyl sulfide starting material and the methanesulfonyl chloride product.

In general, any inorganic acid which is non-oxidizing in its properties, and non-reactive toward the other constituents of the reaction mixture, may be employed. Suitable inorganic acids comprise hydrochloric acid, dilute sulfuric acid, and phosphoric acid, hydrochloric acid being preferred. Where hydrochloric acid is used, it preferably is used in amount sufficient nearly to saturate with hydrogen chloride the aqueous phase of the reaction mixture.

Examples of suitable mutual organic solvents are acetic acid, carbon tetrachloride, chloroform and, in general, the chlorinated lower aliphatic hydrocarbons, carbon tetrachloride being preferred. These are used as desirable or necessary to establish a two-phase reaction mixture, i.e., an organic phase in which the methanesulfonyl chloride product is contained, and from which it may be isolated readily and in a pure condition, and an inorganic phase containing water, hydrochloric acid and formaldehyde.

The reaction by which the chloromethyl methyl sulfide is converted to methanesulfonyl chloride may be carried out simply by forming a reaction mixture containing the chloromethyl methyl sulfide, the water and, if used, the acid and mutual solvent. Chlorine then is added to the mixture, preferably by bubbling it therethrough at a measured and controlled rate. Since the reaction is exothermic, the reaction mixture is cooled to the level indicated above and maintained at that level by suitably applied cooling techniques.

After the reaction has been completed, the organic phase is separated from the inorgnaic phase, dried if necessary and distilled for the separation of the methanesulfonyl chloride product. Yields of product of the order of from 65–80%, based upon the chloromethyl methyl sulfide starting mtaerial, easily are obtained.

It also has been found that the reaction may be expedited, and increased yields obtained, if the chloromethyl methyl sulfide is refluxed with the water in a preliminary step. The refluxing may be carried on for a period of from 5 minutes to 2 or 3 hours. The refluxed product then reacts smoothly and rapidly with the elemental chlorine to form high yields of methane sulfonyl chloride product with minimum chlorinated byproduct formation.

The process of the invention is illustrated by the following examples.

*Example 1*

Monochlorodimethyl sulfide (81.2 g., 0.841 mole) was mixed at room temperature for 5 minutes with 100 grams of water. The resulting mixture was cooled to 0° C. and chlorine gas introduced into it while maintaining its temperature at a level of from 0–10° C.

The introduction of chlorine gas was continued over a period of 120 minutes, during which time 2.6 moles of chlorine were consumed.

The organic phase then was separated, dried and distilled to yield 66.1 grams of methanesulfonyl chloride (0.578 moles, 68.7% yield).

*Example 2*

This example illustrates the inclusion of a refluxing step in the herein described procedure.

Monochlorodimethyl sulfide (81.2 g., 0.841 mole) was refluxed with water (100 g., 5.56 moles) for 75 minutes.

A slight excess of chlorine was bubbled into the reaction mixture while keeping the temperature between 0° C. and 10° C. The chlorine consumption was 2.36 moles.

The organic phase was separated, dried and distilled at atmospheric pressure. It yielded 74.1 g. (0.648 mole) of methanesulfonyl chloride. This represents a yield of 77.0%.

*Example 3*

This example illustrates the application of a mutual organic solvent and an acid aqueous medium in the herein described procedure.

Monochlorodimethyl sulfide (59.0 g., 0.61 mole) was dissolved in 150 ml. carbon tetrachloride and the resulting mixture cooled to —10° C. 40 g. of a 23% aqueous solution of hydrochloric acid was added, thus furnishing an aqueous reactant substantially saturated with hydrogen chloride.

While maintaining the mixture at —10° C. to —20° C., the theoretical amount of chlorine (213 g., 3 moles) was introduced through a fritted tube submerged in the reaction mixture, over a period of 70 minutes.

The product-containing mixture was allowed to warm up to 5° C.; the carbon tetrachloride layer was separated and distilled. 46.5 g., 0.41 mole, of methanesulfonyl chloride was obtained. This represents a yield of 67%.

*Example 4*

This example illustrates the presently described process carried out in the presence of an acidified aqueous phase, but without the presence of a mutual organic solvent.

Monochlorodimethyl sulfide (107.0 g., 1.11 moles) was admixed with 75 grams of water and 29.8 g. of 37% hydrochloric acid. The mixture was refluxed for 10 minutes, then the temperature of the mixture was reduced to 0° C. and maintained at that level while bubbling into it chlorine gas (248 g., 3.5 moles) over a period of 60 minutes.

The organic layer was separated, dried and distilled. The yield of methanesulfonyl chloride was 96.5 g., 0.84 mole, or 75.6%.

As will be apparent, by the present invention we have provided an easily and rapidly effectuated procedure for producing high yields of methanesulfonyl chloride from a chloromethyl methyl sulfide, particularly monochlorodimethyl sulfide. The parent raw material, moreover, is dimethyl sulfide obtained as a byproduct from papermill pulping liquors at low cost. As a consequence, the methanesulfonyl chloride product is obtained at a correspondingly low cost and thus is made available for commercial applications for which it formerly was too costly.

Having thus described our invention in preferred embodiments, we claim as new and desire to protect by Letters Patent:

1. The process of making methanesulfonyl chloride which comprises
   (a) forming a reaction mixture comprising a chloromethyl methyl sulfide, water and chlorine the water and chlorine being present in at least about the stoichiometric amounts, but in insufficient amounts to result, respectively, in the substantial hydrolytic degradation and chlorination of the methanesulfonyl chloride product,
   (b) reacting the chloromethyl methyl sulfide with the water and chlorine at a temperature of from —20° C. to +25° C., thereby converting the chloromethyl methyl sulfide to methanesulfonyl chloride and
   (c) separating the methanesulfonyl chloride from the reaction mixture.

2. The process of claim 1 wherein the chloromethyl methyl sulfide is monochlorodimethyl sulfide.

3. The process of making methanesulfonyl chloride which comprises
   (a) refluxing a chloromethyl methyl sulfide with at least three moles of water for each mole of chloromethyl methyl sulfide, the water being present in amount insufficient to cause substantial hydrolysis of the methanesulfonyl chloride product,
   (b) passing gaseous chlorine into the refluxed mixture of water and chloromethyl methyl sulfide at a temperature of from —20° C. to +25° C. thereby converting the same to methanesulfonyl chloride, the chlorine being used in at least about the stoichiometric amount, but in amount insufficient to result in the formation of substantial amounts of chlorinated by products,
   (c) and separating the methanesulfonyl chloride product from the reaction mixture.

4. The process of claim 3 wherein the chloromethyl methylsulfide is monochlorodimethyl sulfide.

5. The process of making methanesulfonyl chloride which comprises:
   (a) passing gaseous chlorine into a reaction mixture comprising a chloromethyl methyl sulfide, water, at least one mutual organic solvent for the chloromethyl methyl sulfide and an acidifying proportion of a non-oxidizing acid,
   (b) the mutual organic solvent comprising at least one member of the group consisting of acetic acid and the chlorinated lower aliphatic hydrocarbon solvents,
   (c) the non-oxidizing acid comprising at least one member of the group consisting of hydrochloric acid, dilute sulfuric acid and phosphoric acid,
   (d) the water being present in an amount of from 3–10 mols for each mol of chloromethyl sulfide,
   (e) maintaining the reaction mixture at a temperature of —20° to +25° C.,
   (f) continuing the introduction of chlorine into the reaction mixture until an amount of chlorine has been introduced which is at least substantially the stoichiometric amount but which is insufficient to cause substantial chlorination of the methanesulfonyl chloride product,
   (g) and separating the methanesulfonyl chloride product from the reaction mixture.

6. The process of claim 5 wherein the chloromethyl methyl sulfide is monochlorodimethyl sulfide, the mutual organic solvent comprises carbon tetrachloride and the non-oxidizing acid comprises hydrochloric acid.

References Cited by the Examiner

UNITED STATES PATENTS 2,277,325   3/1942   Heuter et al. _____ 260—543
2,664,443   12/1953  Horst et al. _____ 260—543

OTHER REFERENCES

Houben-Weyl: Methoden der Organischen Chemie, vol. 9, 1955, pp. 392–393.

Lee et al.: J. Org. Chem., vol. 5, 1942, pp. 81–85.

Reid: "Org. Chem. of Bivalent Sulfur," vol. II (1960), pp. 48, 64–66 and 271–272 relied on.

Zincke et al.: "Chem. Abstracts," vol. 9, page 55 (1915).

LORRAINE A. WEINBERGER, *Primary Examiner.*

CHARLES B. PARKER, *Examiner.*